US009621006B2

(12) United States Patent
Takimoto et al.

(10) Patent No.: US 9,621,006 B2
(45) Date of Patent: Apr. 11, 2017

(54) ELECTRIC MOTOR WITH SCATTER PREVENTING MEMBER OF BEARING PART

(71) Applicant: FANUC CORPORATION, Yamanashi (JP)

(72) Inventors: Yoshitarou Takimoto, Yamanashi (JP); Akira Yamaguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/690,638

(22) Filed: Apr. 20, 2015

(65) Prior Publication Data
US 2015/0303763 A1 Oct. 22, 2015

(30) Foreign Application Priority Data

Apr. 22, 2014 (JP) .................................. 2014-088124

(51) Int. Cl.
*H02K 5/10* (2006.01)
*H02K 5/15* (2006.01)
*H02K 5/173* (2006.01)

(52) U.S. Cl.
CPC ................. *H02K 5/10* (2013.01); *H02K 5/15* (2013.01); *H02K 5/1732* (2013.01)

(58) Field of Classification Search
CPC .. H02K 5/10; H02K 5/16; F16C 33/78; F16C 33/80; F16C 33/805; F16C 33/82
USPC ..................................................... 310/90, 85
See application file for complete search history.

(56) References Cited

U.S. PATENT DOCUMENTS

| | | | |
|---|---|---|---|
| 6,172,436 B1 * | 1/2001 | Subler | F16C 33/6662 29/898.11 |
| 6,614,142 B1 * | 9/2003 | Bonnieman | H02K 1/24 310/216.004 |
| 7,078,837 B1 * | 7/2006 | Maley | H02K 7/083 310/90 |

FOREIGN PATENT DOCUMENTS

| | | |
|---|---|---|
| JP | H0851752 A | 2/1996 |
| JP | H08294247 A | 11/1996 |
| JP | H08335367 A | 12/1996 |
| JP | 2000074052 A | 3/2000 |
| JP | 2003074491 A | 3/2003 |
| JP | 2004092768 A | 3/2004 |
| JP | 2011250668 A | 12/2011 |
| WO | 2014054098 A1 | 4/2014 |

OTHER PUBLICATIONS integral. (n. d.) American Heritage® Dictionary of the English Language, Fifth Edition. (2011). Retrieved Sep. 29 2016 from http://www.thefreedictionary.com/integral.*
English Abstract for Japanese Publication No. H08-51752 A, published Feb. 20, 1996, 1 page.

(Continued)

*Primary Examiner* — Thomas Truong
(74) *Attorney, Agent, or Firm* — Fredrikson & Byron P.A.

(57) ABSTRACT

An electric motor comprising a housing, a stator which is fastened to the housing, a rotor which is arranged at an inside of the stator, a bearing which is attached to the housing to support a shaft of the rotor, a shield member which is attached to the bearing to prevent scattering of lubricant enclosed in the bearing, and a scatter preventing member which extends from the housing so as to be positioned between the bearing and an iron core of the rotor, and prevents scattering of component parts of the bearing to the inside of the housing.

3 Claims, 3 Drawing Sheets

(56) References Cited

OTHER PUBLICATIONS

English Abstract for Japanese Publication No. H08-294247 A, published Nov. 5, 1996, 1 page.
English Abstract for Japanese Publication No. H08-335367 A, published Dec. 17, 1996, 1 page.
Untranslated Decision to Grant for JP2014-088124, date of mailing Jan. 12, 2016, 3 pages.
Translated Decision to Grant for JP2014-088124, date of mailing Jan. 12, 2016, 3 pages.
Untranslated Notification of Reasons for Refusal for JP2014-088124, date of mailing Aug. 25, 2015, 3 pages.
Translated Notification of Reasons for Refusal for JP2014-088124, date of mailing Aug. 25, 2015, 3 pages.

\* cited by examiner

ELECTRIC MOTOR WITH SCATTER PREVENTING MEMBER OF BEARING PART

BACKGROUND OF THE INVENTION

1. Field of the Invention

The present invention relates to an electric motor with a scatter preventing member which prevents scattering of component parts of a bearing to an inside of a housing.

2. Description of Related Art

In many electric motors, a drive shaft attached to a rotor is supported by bearings which are attached to an end part of a housing on an output side and an end part on an anti-output side. These bearings are fastened by being fit into circumferential grooves which are formed on an inner circumferential surface of the tubular housing. Normally, inner races of the bearings can be moved with respect to outer races within the range of the axial gaps, and therefore depths of the circumferential grooves should be substantially the same as the thicknesses of the outer races in the radial direction so that the inner races do not interfere with the lateral walls of the circumferential grooves. An electric motor with such bearing mounting structures is illustrated in JP-A-H08-51752, JP-A-H08-294247, and JP-A-H08-335367.

In recent years, there has been an increasing need for electric motors with a larger maximum output and maximum torque etc. and excellent compactness. However, if the drive shaft on the electric motor side is coupled by belt to the driven shaft on the load device side, the radial load on the drive shaft is increased as the maximum torque of the electric motor becomes greater. Further, an excessive radial load on the drive shaft may cause damage to or even early destruction of a bearing. If the operation of the electric motor is continued in this state, the bearing will be disassembled and therefore the shield plate, holder, rolling elements, and other bearing parts are liable to be scattered. If the bearing parts are scattered to the inside of the housing, there may be a serious secondary problem which involves damage to the structural parts inside of the housing such as the stator winding and rotor core.

An electric motor which can prevent structural parts inside of the housing from being damaged by the component parts of a bearing is being sought.

SUMMARY OF INVENTION

According to a first aspect of the present invention, there is provided an electric motor comprising a housing, a stator which is fastened to the housing, a rotor which is arranged at an inside of the stator, a bearing which is attached to the housing support a shaft of the rotor, a shield member which is attached to the bearing to prevent scattering lubricant enclosed in the bearing, and a scatter preventing member which extends from the housing so as to be positioned between the bearing and an iron core of the rotor, and prevents scattering of component parts of the bearing to the inside of the housing.

According to a second aspect of the present invention, there is provided an electric motor in the first aspect, wherein the scatter preventing member is spaced from the bearing by a distance which is larger than ½ of an axial gap of the bearing in a direction parallel to a direction of extension of the shaft.

According to a third aspect of the present invention, there is provided an electric motor in the first or second aspect, wherein the scatter preventing member has a center hole through which the shaft is inserted, the bearing is a rolling bearing which comprises pluralities of rolling elements, and a diameter of the center hole is smaller than a sum of the diameter of the shaft plus two times the diameter of the rolling elements.

According to a fourth aspect of the present invention, there is provided an electric motor in any one of the first to third aspects, wherein the scatter preventing member is formed from a metal material.

According to a fifth aspect of the present invention, there is provided an electric motor in any one of the first to fourth aspect, wherein the scatter preventing member is formed integrally with the housing.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
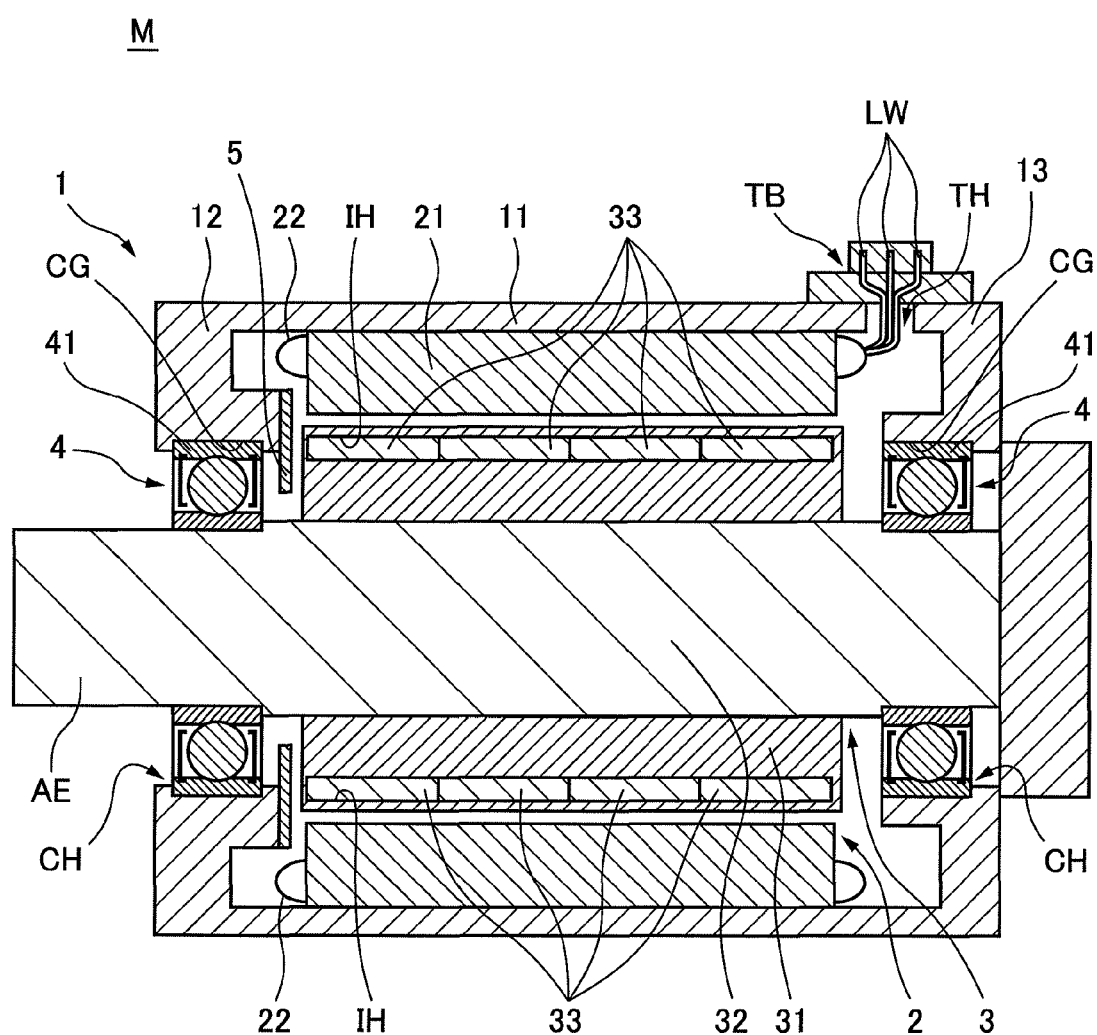
FIG. 1 is a longitudinal cross-sectional view of an illustrative electric motor of an embodiment of the present invention.
Figure 2:
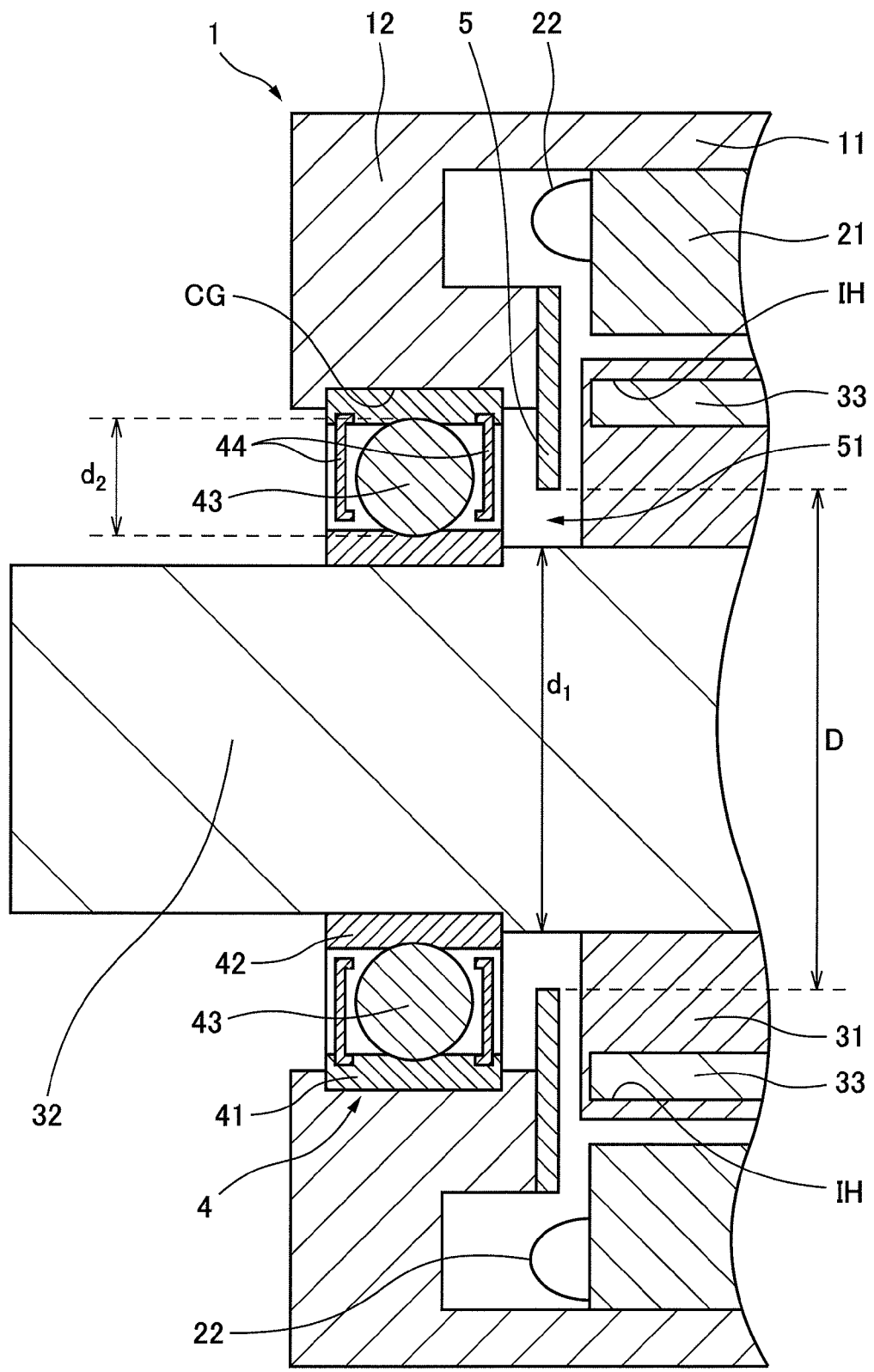
FIG. 2 is a partial enlarged view of FIG. 1 which shows a scatter preventing member and its vicinity in the electric motor of FIG. 1.
Figure 3:
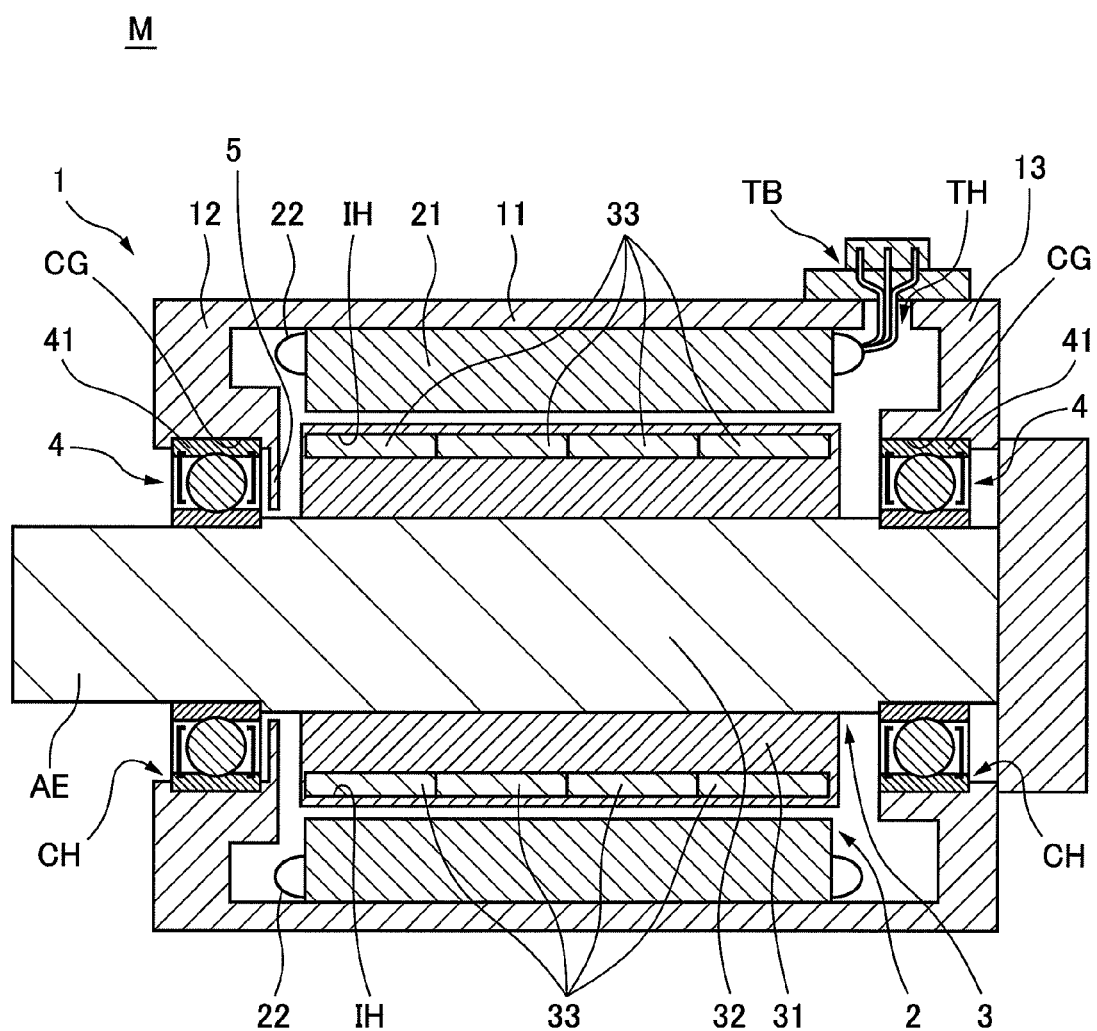
FIG. 3 is a longitudinal cross-sectional view similar to FIG. 1 which shows an electric motor employing a modification of the scatter preventing member.

Referring to FIG. 1 to FIG. 3, an electric motor of one embodiment of the present invention will be explained. The electric motor of the present embodiment is a rotary type electric motor where the rotor and stator cooperate to generate power. More specifically, the electric motor of the present embodiment is an IPM (interior permanent magnet) motor which has a structure where permanent magnets are embedded inside of a rotor. FIG. 1 is a longitudinal cross-sectional view of an illustrative electric motor M. As shown in FIG. 1, the electric motor M of the present example comprises a housing 1 which has a tubular main body 11, a stator 2 and rotor 3 which are arranged inside of the main body 11, and a pair of bearings 4, 4 which are attached to the housing 1 to support a shaft 32 of the rotor 3. These will be explained in order below. Note that, in the following explanation, the direction of extension of the shaft 32 will sometimes be simply referred to as the "axial direction".

As shown in FIG. 1, the housing 1 of the present example has the tubular main body 11 which extends along the axial direction, and lateral wall parts 12, 13 which close the two end parts of the main body 11 in the direction of extension. These lateral wall parts 12, 13 are provided with columnar center holes CH which extend along the axial direction. The inner circumferential surfaces of the center holes CH are provided with circumferential grooves CG which have dimensions and shapes corresponding to the outer races 41 of the bearings 4. Below, the lateral wall part 12 closer to the front end part AE of the shaft 32 which projects to the outside of the housing 1 may be referred to as the output side lateral wall part 12, while the lateral wall part 13 on the opposite side to this may be referred to as the anti-output side lateral wall part 13. As shown in FIG. 1, a predetermined location of the main body 11 which adjoins the lateral wall part 13 at the anti-output side is provided with a through hole TH which extends vertical to the axial direction. The later explained lead wires LW of the stator winding 22 are inserted through the through hole TH. Further, a terminal board TB is attached to the outer circumferential surface of the main body 11 so as to close the through hole TH.

Next, the stator 2 of the present example has a tubular stator core 21 which has the structure of a plurality of stacked electrical steel sheets, and a stator winding 22 which is attached to the stator core 21. As shown in FIG. 1, the outer circumferential surface of the stator core 21 is fixed to the inner circumferential surface of the main body 11 of the housing 1. The stator core 21 and the main body 11 therefore are concentric. Further, the inner circumferential surface of the stator core 21 has a plurality of slots which extend along the axial direction, and are arranged at equal intervals. The stator winding 22 is arranged inside these slots. Further, lead wires LW of the stator winding 22 are electrically connected to metal terminal parts of the terminal board TB. Therefore, if an alternating current power source is connected to the terminal board TB, a rotating magnetic field is formed around the shaft by the alternating current which flows through the stator winding 22.

Next, the rotor 3 of this example has a cylindrical rotor core 31 which has the structure of a plurality of stacked electrical steel sheets, and a shaft 32 which is fit into a center hole of the rotor core 31 so as to rotate together with the rotor core 31. As shown in FIG. 1, the rotor core 31 has a plurality of insertion holes IH which are arranged at equal intervals along the circumferential direction. Each insertion holes IH is located inward in the radial direction from the outer circumferential surface of the rotor core 31 by a predetermined distance, and extends over substantially the entire length of the rotor core 31 in the axial direction. Further, each insertion hole IH has a plurality of flat plate shaped magnets 33 which are inserted therein to be arranged along the axial direction. The magnets 33 of this example are ferrite magnets or neodymium magnets or other permanent magnets. The outer surfaces of these magnets 33 are bonded to the inside surfaces of the insertion holes IH.

Further, the shaft 32 of the present example is supported by an output side bearing 4 which is attached to the output side lateral wall part 12 of the housing 1, and by a bearing 4 which is attached to the anti-output side lateral wall part 13. The front end part AE of the shaft 32 can be connected with the driven shaft of a machine tool or peripheral equipment or other load device (not shown). The rotational drive force of the electric motor M is thereby transmitted to various load devices. For example, the rotational drive force of the electric motor M is transmitted to the load device through an endless belt stretched between a drive pulley which is attached to the front end part AE of the shaft 32, and a driven pulley which is attached to the front end part of the driven shaft. Such a drive system of a load device is generally called a belt drive system.

Next, the bearings 4 in the electric motor M of the present example will be explained. FIG. 2 is a partial enlarged view of FIG. 1 which shows the output side bearing 4 and its vicinity in the electric motor M of FIG. 1. Note that, the output side bearing 4 and the anti-output side bearing 4 have similar structures, and therefore only the output side bearing 4 will be explained below. As shown in FIG. 2, the output side bearing 4 comprises a cylindrical outer race 41, a cylindrical inner race 42 with a smaller dimension in the radial direction than the outer race 31, a plurality of rolling elements 43 which are arranged between the outer race 41 and inner race 42, and a holder (not shown) which holds these rolling elements 43 at equal intervals along the circumferential direction. A bearing with such a structure is generally called a "rolling bearing". Further, the outer race 41 of the output side bearing 4 is fit in the above-mentioned circumferential groove CG of the output side lateral wall part 12, while the shaft 32 is fit in the center hole of the inner race 42.

As shown in FIG. 2, the output side bearing 4 has ring-shaped shield members 44 attached thereto, and the ring-shaped shield members 44 at least partially close the ring-shaped opening part between the outer race 41 and the inner race 42 so that the plurality of rolling elements 43 are not exposed to the outside of the bearing 4. More specifically, the output side bearing 4 has a pair of shield members 44, 44 which are attached thereto and arranged along the axial direction so as to straddle the plurality of rolling elements 43. These shield members 44, 44 are fit in circumferential grooves which are formed in the inner circumferential surface of the outer race 41. The shield members 44 of the present example mainly have the function of preventing scattering to the outside of the bearing 4, of the lubricant which is enclosed in the bearing 4, in particular the lubricant which is coated on the outer race 41 and inner race 42 and the contact parts of the rolling elements 43. It is therefore possible to prevent the lubricant enclosed in the bearing 4 from being scattered to the inside of the main body 11 of the housing 1 and adhering to the rotor core 31 and stator winding 22 etc. Note that, each shield member 44 of the output side bearing 4 may also be fit in the inner race 42 instead of the outer race 41 of the bearing 4, or may also be attached to the inside circumferential surface of the lateral wall part 12 of the housing 1.

Incidentally, if the above-mentioned belt drive system is employed as the drive system for driving a load device by the electric motor M, the radial load applied to the shaft 32 is increased as the maximum torque of the electric motor M becomes larger. Further, if the shaft 32 is subjected to an excessive radial load, the output side bearing 4 is destroyed, and thereby the component parts of the bearing 4 may be scattered. The "component parts of the bearing 4" referred to herein include the above-mentioned shield members 44, rolling elements 43, and holder. Therefore, the electric motor M of the present example comprises a scatter preventing member 5 which prevents scattering of the component parts of a destroyed bearing 4 to the inside of the main body 11 of the housing 1. Next, referring to FIG. 2, the scatter preventing member 5 of the present example will be explained in detail.

As shown in FIG. 2, the scatter preventing member 5 of the present example has a disk shape which is arranged vertical to the axial direction. The center part of the scatter preventing member 5 is provided with a center hole 51 through which the shaft 32 may be inserted. Further, the scatter preventing member 5 of the present example is attached to the end face of the lateral wall part 12 of the housing 1 which faces the stator core 21 and rotor core 31. Note that, the scatter preventing member 5 of the present example is preferably spaced from the bearing 4 in the axial direction by a distance larger than ½ of the axial gap of the bearing 4. The "axial gap" which is referred to herein means the maximum amount of movement when the inner race 42 is moved forward and backward in the axial direction in the state where the outer race 41 is fixed in place. According to the above-mentioned arrangement of the scatter preventing member 5, even if the inner race 42 of the bearing 4 is moved with respect to the outer race 41 in the axial direction due to an axial load on the shaft 32 etc., it is possible to prevent the inner race 42 of the bearing 4 from contacting the scatter preventing member 5.

In this way, a scatter preventing member 5 is interposed between the output side bearing 4 and the rotor core 3 so as to be arranged vertically to the axial direction. Therefore, even if the component parts of the bearing 4 is moved toward the rotor core 31, these component parts will strike the scatter preventing member 5 and will be stopped by the scatter preventing member 5. Further, the scatter preventing member 5 of the present example is preferably formed from a metal material which has a high degree of rigidity so as not to deform by the impact when it is struck by the component parts of the bearing 4. However, the scatter preventing member 5 of the present example may also be formed from various plastic materials or composite materials which have a high degree of rigidity. Furthermore, the scatter preventing member 5 of the present example is preferably firmly fastened to the housing 1 by fastening members such as bolts and nuts so as not to drop off from the housing 1 due to the impact when it is struck by the component parts of the bearing 4. However, the scatter preventing member 5 of the present example may also be welded to the housing 1 or may also be bonded to the housing 1 by various adhesives.

Further, in the electric motor M of the present example, the dimensions of the center hole 51 of the scatter preventing member 5 can be optimized so as to reliably prevent component parts of the bearing 4 from scattering to the inside of the main body 11. For example, the diameter (D) of the center hole 51 of the scatter preventing member 5 is preferably smaller than the sum of the diameter ($d_1$) of the shaft 32 plus two times the diameter ($d_2$) of the rolling elements 43. That is, $D<d_1+d_2 \times 2$ is preferable. This ensures that, even if the bearing 4 is destroyed and the shaft 32 is thus tilted from its inherent axial direction, there will never be a gap between the outer circumferential surface of the shaft 32 and the inner circumferential surface of the scatter preventing member 5 which is larger than the diameter ($d_2$) of the rolling elements 43. Therefore, according to the dimensions of the above-mentioned center hole 51, it is possible to reliably prevent scattering of the rolling elements 43 of the bearings 4 to the inside of the main body 11. However, if the diameter (D) of the center hole 51 of the scatter preventing member 5 is extremely close to the diameter ($d_1$) of the shaft 32, the inner circumferential surface of the scatter preventing member 5 is liable to contact the outer circumferential surface of the shaft 32 due to the radial gap of the bearing 4 etc. The "radial gap" referred to herein means the maximum amount of movement when the inner race 42 is moved in the radial direction in the state where the outer race 41 is fixed in place. For this reason, the diameter (D) of the center hole 51 is preferably larger than the sum of the diameter ($d_1$) of the shaft 32 plus the radial gap (g) of the bearing 4. That is, $D>d_1+g$ is preferable.

As explained above, according to the electric motor M of the present example, even if a bearing 4 is destroyed and component parts of the bearing 4 are thus moved toward the rotor core 31, these component parts will strike the scatter preventing member and will be stopped by the scatter preventing member. Therefore, according to the electric motor M of this example, even if the bearing 4 is destroyed due to excessive radial load etc., it is possible to prevent scattering of the component parts of the bearing 4 to the inside of the main body 11 of the housing 1 where the stator 2 and rotor 3 are located, and therefore it is possible to prevent damages to the structural parts which are located at the inside of the main body 11 such as the stator winding 22 and rotor core 31. As a result, even if a bearing 4 is destroyed, it is possible to eliminate the need to repair or replace the structural parts which are located at the inside of the main body 11. It is also possible to reuse the electric motor M just by replacing the bearing 4, and thus possible to lighten the burden on the user in cost and manhour.

Next, modifications of the scatter preventing member 5 in the electric motor M of the present embodiment will be explained. FIG. 3 is a longitudinal cross-sectional view similar to FIG. 1 which shows an electric motor M employing a scatter preventing member 5 of the present example. As will be understood from a comparison between FIG. 1 and FIG. 3, a scatter preventing member 5 is formed separately from the housing 1 and then attached to the lateral wall part 12 of the housing 1 in the example of FIG. 1. However, the scatter preventing member 5 is formed integrally with the housing 1 in the example of FIG. 3. More specifically, the scatter preventing member 5 of the present example is formed integrally with the lateral wall part 12 on the output side of the housing 1 by means of casting or machining of various metal materials. The dimensions and shape etc. of the scatter preventing member 5 of the present example are similar to the example of the above-mentioned FIG. 1. The structures of the parts other than the scatter preventing member 5 in the electric motor M of the present example are also similar to the above-mentioned example of the FIG. 1.

According to the electric motor M, it is possible to prevent the scatter preventing member 5 from dropping off from the lateral wall part 12 of the housing 1 due to impact when it is struck by the component parts of the bearing 4. Therefore, according to the electric motor M of the present example, it is possible to prevent penetration of the scatter preventing member 5 to the inside of the main body 11 of the housing 11, and thus possible to prevent damage to the stator winding 22 and rotor core 31 etc. Furthermore, according to the electric motor M of the present example, it is possible to reduce the number of parts of the housing 1, and thus possible to simplify the assembly process of the housing 1.

EFFECT OF INVENTION

According to the first aspect of the present invention, even if a bearing is destroyed and thus component parts of the bearing is moved toward the rotor core, these component parts will strike the scatter preventing member and will be stopped by the scatter preventing member. Therefore, according to the first aspect, even if a bearing is destroyed due to excessive radial load etc., it is possible to prevent scattering of the component parts of the bearing to the inside of the housing in which the stator and rotor are located, and thus possible to prevent damage to the structural parts located at the inside of the housing such as the stator winding and rotor core. As a result, according to the first aspect, even if a bearing is destroyed, it is possible to eliminate the need to repair or replace the structural parts located at the inside of the housing. It is possible to reuse the electric motor just by replacing the bearing, and thus possible to lighten the burden on the user in cost and manhour.

According to the second aspect of the present invention, even if the inner race of the bearing is moved with respect to the outer race in the axial direction due to an axial load etc., it is possible to prevent the inner race of the bearing from contacting the scatter preventing member.

According to the third aspect of the present invention, even if a bearing is destroyed and the shaft is thus tilted with respect to its inherent axial direction, it is possible to at least prevent scattering of the rolling elements of the bearing to the inside of the housing.

According to the fourth aspect of the present invention, by selecting a metal material with a suitable rigidity, it is possible to prevent the scatter preventing member from being deformed due to impact when it is struck by the component parts of a bearing.

According to the fifth aspect of the present invention, it is possible to prevent the scatter preventing member from dropping off from the housing due to impact when it is struck by the component parts of a bearing. Therefore, according to the fifth aspect, it is possible to prevent penetration of the scatter preventing member to the inside of the housing, and thus possible to prevent damage to the stator winding and rotor core etc. Furthermore, according to the fifth aspect, it is possible to reduce the number of parts of the housing, and thus possible to simplify the assembly process of the housing.

The present invention is not limited to the above-mentioned embodiments but can be modified in various ways within the scope described in the claims. For example, in the above-mentioned embodiments, the scatter preventing member 5 is attached to only the lateral wall part 12 on the output side of the housing 1. However, in the electric motor M of the present invention, scatter preventing members 5 may also be attached to both the lateral wall part 12 on the output side and the lateral wall part 13 on the anti-output side. Further, the above-mentioned embodiments employed an IPM motor with a structure where permanent magnets 33 are embedded in the rotor core 31. However, the electric motor M of the present invention may also be an SPM (Surface Permanent Magnet) motor with a structure where permanent magnets 33 are stuck to the outer circumferential surface of the rotor core 31 or other type of motor. Further, the dimensions, shapes, materials, etc. of the above-mentioned parts are only examples. Various dimensions, shapes, materials, etc. can be employed for achieving the effects of the present invention.

The invention claimed is:

1. An electric motor comprising:
   a housing,
   a stator which is fastened to said housing,
   a rotor which is arranged at an inside of said stator,
   a bearing which is attached to said housing to support a shaft of said rotor, the bearing comprising a rolling element,
   a shield member which is attached to said bearing to prevent scattering of lubricant enclosed in said bearing, and
   a scatter preventing member which extends from said housing so as to be positioned between said bearing and an iron core of said rotor, and prevents scattering of at least one of said shield member, and said rolling element to the inside of said housing,
   wherein the scatter preventing member is formed integrally with the housing, and
   wherein said scatter preventing member has a center hole through which said shaft is inserted,
   said bearing is a rolling bearing which comprises pluralities of rolling elements,
   a diameter of said center hole is less than a sum of the diameter of said shaft plus two times the diameter of said rolling elements, and
   the scatter preventing member forms a radial gap with respect to the shaft of the rotor such that the scatter preventing member does not contact the shaft of the rotor.

2. The electric motor according to claim 1, wherein said scatter preventing member is spaced from said bearing by a distance which is larger than ½ of an axial gap of said bearing in a direction parallel to a direction of extension of said shaft.

3. The electric motor according to claim 1, wherein said scatter preventing member is formed from a metal material.

* * * * *